(12) United States Patent
Lindholm (10) Patent No.: US 11,576,133 B2
(45) Date of Patent: Feb. 7, 2023

(54) TIMING SYNCHRONIZATION OF 5G V2X SIDELINK TRANSMISSIONS

(71) Applicant: Nokia Technologies Oy, Espoo (FI)

(72) Inventor: Jari Olavi Lindholm, Palojoki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/279,324

(22) PCT Filed: Sep. 24, 2019

(86) PCT No.: PCT/EP2019/075684
§ 371 (c)(1),
(2) Date: Mar. 24, 2021

(87) PCT Pub. No.: WO2020/064716
PCT Pub. Date: Apr. 2, 2020

(65) Prior Publication Data
US 2021/0400605 A1 Dec. 23, 2021

Related U.S. Application Data

(60) Provisional application No. 62/738,680, filed on Sep. 28, 2018.

(51) Int. Cl.
*H04W 56/00* (2009.01)
*H04W 4/46* (2018.01)
*H04W 92/18* (2009.01)

(52) U.S. Cl.
CPC ......... *H04W 56/001* (2013.01); *H04W 4/46* (2018.02); *H04W 56/006* (2013.01); *H04W 92/18* (2013.01)

(58) Field of Classification Search
CPC ............. H04W 56/001; H04W 4/46; H04W 56/006; H04W 92/18; H04W 56/0025; H04W 56/0045; H04W 56/005; H04W 56/0015
See application file for complete search history.

(56) References Cited

U.S. PATENT DOCUMENTS

2017/0215119 A1* 7/2017 Hong .................. H04L 67/12
2018/0049104 A1* 2/2018 Van Phan ............ H04W 84/10
(Continued)

FOREIGN PATENT DOCUMENTS

KR 20170093693 A 8/2017
WO 2018/175553 A1 9/2018

OTHER PUBLICATIONS

"Revised SID: Study on NR V2X", 3GPP TSG RAN Meeting #81, RP-182111, Agenda : 9.3.6, LG Electronics, Sep. 10-13, 2018, 6 pages.
(Continued)

*Primary Examiner* — Ashley Shivers
(74) *Attorney, Agent, or Firm* — Mintz Levin Cohn Ferris Glovsky and Popeo, P.C.

(57) ABSTRACT

Methods and apparatus, including computer program products, are provided for timing synchronization of sidelinks. In some example embodiments, there may be provided an apparatus including at least one processor and at least one memory including computer program code, the at least one memory and the computer program code configured to, with the at least one processor, cause the apparatus to at least receive information to enable synchronized operation of a vehicle-to-vehicle sidelink with another user equipment; and configure the vehicle-to-vehicle sidelink. Related systems, methods, and articles of manufacture are also disclosed.

18 Claims, 5 Drawing Sheets

(56) References Cited

U.S. PATENT DOCUMENTS

| | | | |
|---|---|---|---|
| 2019/0045465 A1* | 2/2019 | Lee | H04W 92/18 |
| 2019/0045521 A1 | 2/2019 | Hong et al. | |
| 2020/0008266 A1* | 1/2020 | Pan | H04W 28/06 |
| 2021/0176720 A1* | 6/2021 | Chae | H04W 56/004 |
| 2022/0007403 A1* | 1/2022 | Li | H04W 72/1289 |

OTHER PUBLICATIONS

"3rd Generation Partnership Project; Technical Specification Group Services and System Aspects; System Architecture for the 5G System; Stage 2 (Release 15)", 3GPP TS 23.501, V15.3.0, Sep. 2018, pp. 1-226.

International Search Report and Written Opinion received for corresponding Patent Cooperation Treaty Application No. PCT/EP2019/075684, dated Dec. 20, 2019, 13 pages.

"SLSS and PSBCH design for V2V", 3GPP TSG RAN WG 1 Meeting #84, R1-160758, Agenda : 7.3.2.4, Huawei, Feb. 15-19, 2016, 5 pages.

\* cited by examiner

UE 150C    UE 150B    gNB 152A

202 → Indication A regarding whether the V2X SL carrier is shared with Uu transmissions or the carrier is dedicated to V2X SL transmissions, indication B regarding whether the gNBs and/or eNBs operating in the carrier are synchronized or not, indication C regarding whether the gNB or eNB that V2X UE is receiving is synchronized to GNSS/UTC, and/or indication D regarding whether gNBs and eNBs of the operator have the common synchronization source 204 — UE configures, based on received indication(s), sidelink for V2X 206 — UEs establishes V2X sidelink

TIMING SYNCHRONIZATION OF 5G V2X SIDELINK TRANSMISSIONS

RELATED APPLICATION

This application claims priority to PCT Application No. PCT/EP2019/075684, filed on Sep. 24, 2019, which claims priority to U.S. Provisional Application No. 62/738,680, filed on Sep. 28, 2018, each of which is incorporated herein by reference in its entirety.

FIELD

The subject matter described herein relates to vehicle-to-everything (V2X) communications.

BACKGROUND

In vehicle-to-everything (V2X), vehicles may be equipped with user equipment configured to wirelessly communicate with other user equipment, such as vehicle-to-vehicle (V2V) user equipment, vehicle-to-network nodes (V2N), vehicle-to-pedestrian (V2P), and/or any other type of device. The V2X messages may be used to exchange messages, such as traffic related messages, alerts, autonomous or semi-autonomous driving messages, and/or any other type of data or message. For example, a V2X message may be sent from a first vehicle via a sidelink to other nearby vehicles warning the other vehicles of a hazardous traffic condition.

SUMMARY

Methods and apparatus, including computer program products, are provided for timing synchronization of sidelinks.

In some example embodiments, there may be provided an apparatus including at least one processor and at least one memory including computer program code, the at least one memory and the computer program code configured to, with the at least one processor, cause the apparatus to at least receive information to enable synchronized operation of a vehicle-to-vehicle sidelink with another user equipment; and configure the vehicle-to-vehicle sidelink.

In some variations, one or more of the features disclosed herein including the following features can optionally be included in any feasible combination. The vehicle-to-vehicle sidelink may be on a dedicated carrier to at least the other user equipment. The vehicle-to-vehicle sidelink may be on a shared carrier that is shared with at least a base station. The information may include an indication regarding whether the vehicle-to-vehicle sidelink is on a shared carrier with an uplink to a base station. The information may include an indication regarding whether a carrier is dedicated to the vehicle-to-vehicle sidelink. The information may include an indication regarding whether one or more base stations operating in the carrier are synchronized. The one or more base stations comprise all of the base stations operating in the carrier. The information may include an indication regarding whether the base station being received by the user equipment is synchronized to a global navigation system timing source, a coordinated universal time, and/or a global positioning system timing source. The information may include an indication regarding whether a plurality of the base stations including an evolved node B base station and a 5G node B base station have a common synchronization source. The user equipment may receive, from the base station, a location of the base station to enable the user equipment to compensate for timing error in network-based synchronization caused by propagation delay. The apparatus may be further caused to establish the configured vehicle-to-vehicle sidelink.

In some example embodiments, there may be provided an apparatus including at least one processor and at least one memory including computer program code, the at least one memory and the computer program code configured to, with the at least one processor, cause the apparatus to at least provide a radio access network to a user equipment configured to provide a vehicle-to-vehicle sidelink; and send information to the user equipment, the information enabling synchronized operation of the vehicle-to-vehicle sidelink between the user equipment and another user equipment.

In some variations, one or more of the features disclosed herein including the following features can optionally be included in any feasible combination. The apparatus may be further caused to at least allocate a carrier to be shared between the vehicle-to-vehicle sidelink and an uplink. The information may include an indication regarding whether the vehicle-to-vehicle sidelink is on a shared carrier with an uplink to a base station. The information may include an indication regarding whether a carrier is dedicated to the vehicle-to-vehicle sidelink. The information may include an indication regarding whether one or more base stations operating in the carrier are synchronized. The information may include an indication regarding whether the base station being received by the user equipment is synchronized to a global navigation system timing source, a coordinated universal time, and/or a global positioning system timing source. The information may include an indication regarding whether a plurality of the base stations including an evolved node B base station and a 5G node B base station have a common synchronization source. The base station may send location information of the base station to enable compensation for timing error in network-based synchronization caused by propagation delay.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

The V2X sidelink transmission may be established on a dedicated carrier or may be established on a shared carrier, such as a carrier shared with for example a base station and one or more other user equipment. In the dedicated case, a sidelink transmission may be established on a dedicated V2V carrier between, for example, a first vehicle including a first user equipment and a second vehicle including a second user equipment. In the shared carrier case, the uplink to the base station (e.g., an LTE eNB base station, a 5G Node B (gNB), and/or other types of base stations) and the sidelink transmissions to V2X user equipment share a carrier. For example, the uplink and sidelink may be multiplexed to enable sharing the same radio resources using frequency division multiplex and/or time division multiplex.

In V2X, the sidelink (SL) transmissions on a carrier should use the same synchronization signal, such as a global navigation satellite systems (GNSS, e.g., the Global Positioning System (GPS) and/or the like), coordinated universal time (UTC), or some other type (e.g., timing derived or obtained from the cellular network) of synchronization signal or source, such as timing obtained or derived from the cellular network.

Moreover, the sidelink transmissions may also be established in areas where there is no cellular coverage provided by a cellular base station (e.g., eNB, gNB, and/or the like) or where there is no synchronization signal coverage, such as GNSS. As noted, the GNSS may be used to provide synchronization that is a common synchronization signal available everywhere where the GNSS can be received, although there are locations where GNSS cannot be received (e.g., in tunnels, etc.). Furthermore, in the case of cellular networks, such as 5G, 4G, and LTE, these cellular networks may (or may not) be synchronized to a GNSS.

With respect to sidelink transmission synchronization, the sidelink transmission may use different synchronization, or timing, when compared to the transmissions between user equipment and base station. This difference may be problematic, especially in the case of a shared carrier implementations where the sidelinks (between or among UEs in vehicles) share a carrier with the user equipment uplinks to a base station. And in a given cellular network, a 4G/LTE eNB base station and a 5G gNB base station may not use a common synchronization source. In view of the foregoing, it is not straightforward to select a synchronization source that is common to all V2X sidelink UEs (e.g., UEs configured with V2X sidelinks).

In some example embodiments, a network node, such as a base station, may send information, such as at least one indication, to a first user equipment included, for example, in a first vehicle (e.g., the first V2X UE). The at least one indication may indicate: (1) whether the V2X sidelink carrier is shared with Uu transmissions (e.g., the Uu interface between a user equipment (UE) and base station) or whether the carrier is dedicated to V2X sidelink transmissions; (2) whether the base stations (e.g., gNBs and/or eNBs) operating in the carrier are synchronized or not; (3) whether the gNB base station or eNB base station (which is being received by the V2X UE) is synchronized to GNSS, UTC, or some other type of synchronization source or signal; and/or (4) whether the base stations (e.g., gNBs and eNBs) of the cellular network/operator have a common synchronization source. The first V2X UE may, based on the received at least one indication configure a sidelink to a second V2X user equipment included in, for example, a second vehicle. The first V2X user equipment may then establish the configured V2X sidelink (which in this example is a V2V sidelink) to the second V2X user equipment.

Figure 1A:
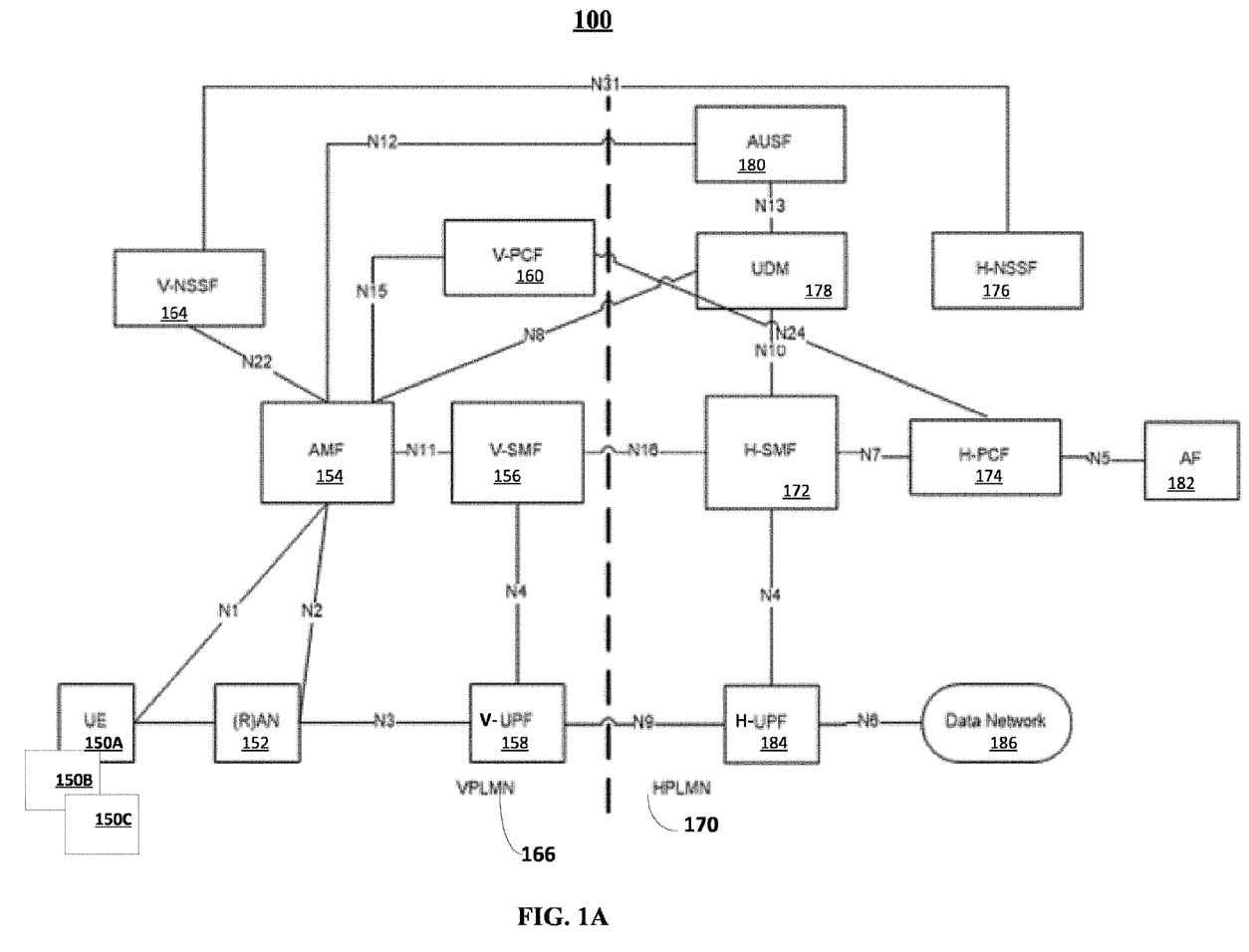
FIG. 1A-FIG. 1B depict examples of a 5G system including V2X user equipment having sidelinks, in accordance with some example embodiments.
Figure 1B:
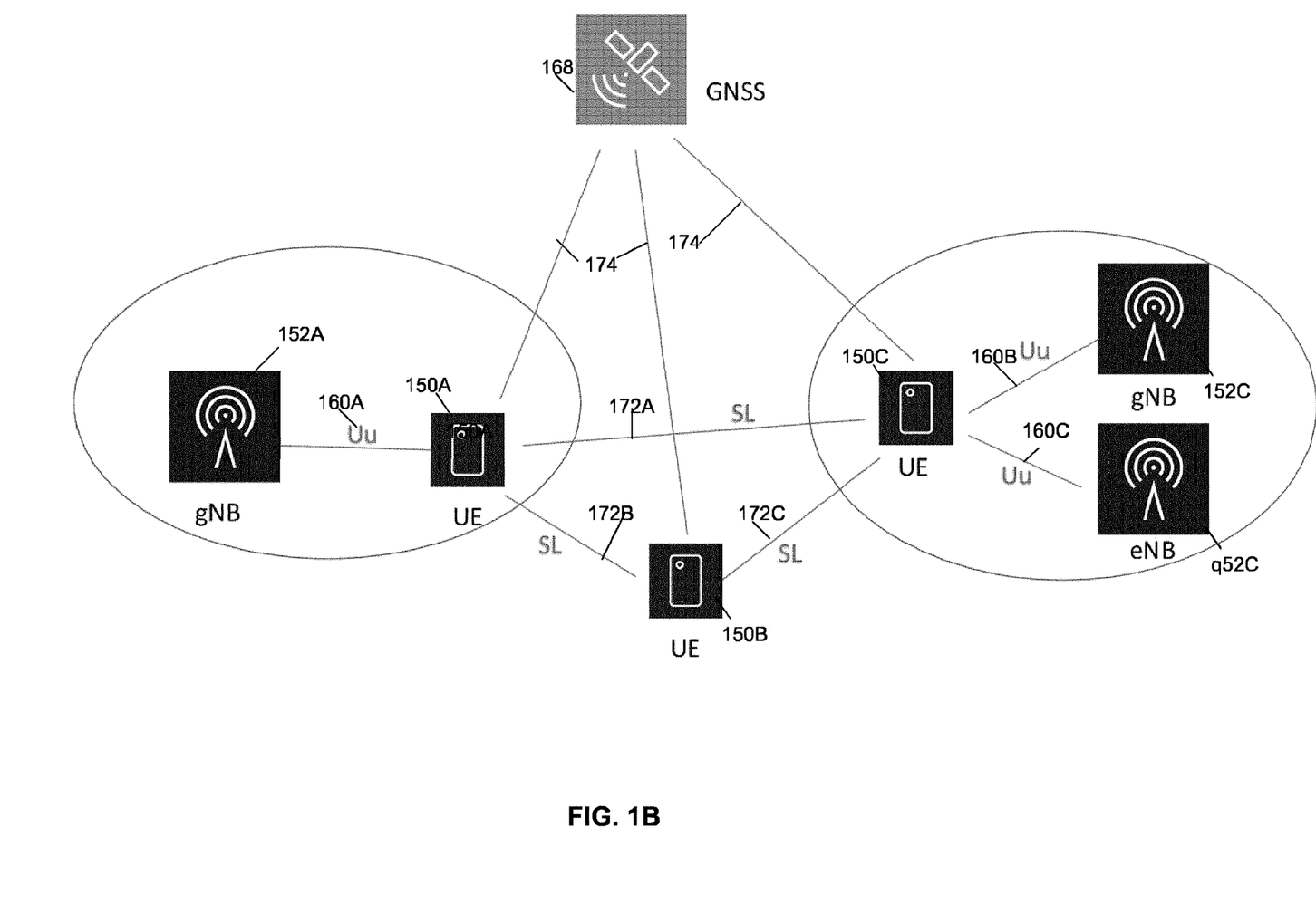

Before providing additional description regarding configuring synchronization for sidelinks in accordance with some example embodiments, an example of a portion of a 5G wireless network 100 is described with respect to FIGS. 1A-1B.

The 5G wireless network 100 may include user equipment (UE) 150A-C configured to wirelessly couple to a radio access network (RAN) 152 being served by a wireless access point, such as a base station, wireless local area network access point, home base station, and/or other type of wireless access point. When visiting a network, the UE may access the network's radio access network. The network 100 may include a core network, which may include an access and mobility management function (AMF) 154, a visiting session management function (V-SMF) 156, a visiting policy control function (v-PCF) 160, a visiting network slice selection function (v-NSSF) 164, and/or a visiting user plane function (V-UPF) 158. In the example of FIG. 1A, devices 152-164 may be associated with a visiting public land mobile network (VPLMN) 166. The network 100 and/or the core network may include devices having functions supporting a home public land mobile network (HPLMN) 170 as well. For example, these devices in the HPLMN 170 may include devices and corresponding functions for "home" wireless local area network (WLAN) access, offloading, and/or non-3GPP access. These devices may include a home SMF 172, a home PCF 174, a home NSSF 176, unified data management 178, an authentication server function (AUSF) 180, an application function (AF) 182, a home user plane function (H-UPF) 184, and a data network (DN) 186.

FIG. 1A also depicts service interfaces, such as N1, N2, N3, N4, N6, N7, N11, N15, N18, N24, and/or the like. The architecture, nodes (including AMF, V-PCF, H-PCF, H-SMF, and V-SMF as well as other devices depicted at FIG. 1A), and the service interfaces may be defined in accordance with a standard, such as 3GPP TS 23.501, although other standards as well as proprietary interfaces may be used. Although FIG. 1A depicts a single visiting network and a single home network, other quantities of visiting and/or home network may be included as well.

FIG. 1B depicts a portion of the system 100 and, in particular, a plurality of user equipment (UE) 150A-C including V2X and, in particular, V2V sidelinks 102A-C. The sidelinks may be device-to-device (D2D) sidelinks and/or broadcasts. FIG. 1B also shows uplinks 104A-C (via, e.g., Uu interfaces) to corresponding base stations 152A-C (labeled gNB). FIG. 1B also depicts a synchronization source, such as GNSS 168, configured to provide a synchronization signal 106.

In a dedicated 5G sidelink carrier for example, the V2X UE, such as UE 150A, may prioritize having sidelink synchronization from a universally specified timing source, such as UTC timing which may be obtained from the GNSS 168 or from other synchronization sources.

In a shared carrier implementation, the V2X UE, such as UE 150A, may prioritize having sidelink synchronization from a network-based timing source especially when the base stations (e.g., gNBs or eNBs) of the carrier are synchronized. If the base stations are not synchronized, part of the frequency and time resources of the shared carrier may be allocated to V2X transmissions (e.g., bandwidth part concept specified in 5G/gNB (or New Radio) allows the use of different numerologies in a carrier to enable sharing), and the timing preference of the V2X transmission may be (pre)configured for this non-synchronized case, or the UE may always prefer GNSS/UTC timing in the bandwidth part dedicated to sidelink transmissions. If the UE receives an indication that gNBs/eNBs are synchronized to GNSS/UTC, the UE knows that it can switch to timing (if need due to for example a loss of GNSS signal) obtained from cellular network and continue V2X transmissions. If the UE receives an indication that eNB and gNB are synchronized, the UE knows that it may use a synchronization source from either the eNB or gNB. If gNB and eNB are not synchronized, the UE (which is operating in a 5G sidelink) knows that if the UE cannot receive gNB signals, the UE needs to find a sidelink UE synchronized to gNB, rather than accessing an eNB as synchronizations source.

To enable a V2X UE to make a synchronization source selection, one or more of the following may be provided to the V2X UE for the V2X sidelink establishment:
(1) whether the V2X sidelink carrier is shared with Uu transmissions (e.g., the Uu interface between a UE and base station) or whether the carrier is dedicated to V2X sidelink transmissions;
(2) whether the base stations (e.g., gNBs and/or eNBs) operating in the carrier are synchronized or not;
(3) whether the gNB base station or eNB base station (which is being received by the V2X UE) is synchronized to GNSS, UTC, or some other type of synchronization source or signal; and/or
(4) whether the base stations (e.g., gNBs and eNBs) of the cellular network/operator have a common synchronization source.

With respect to whether the gNBs and/or eNBs operating in the carrier are synchronized or not (2 above), the gNBs or eNBs in a cellular network may be synchronized to an external synchronization source or the base stations may instead use internal clocks to create synchronization signals for the UEs. If the base stations are synchronized, then sidelink transmissions between UEs connected to different base stations have a common synchronization. But if base stations are unsynchronized, the common timing between sidelink UEs (e.g., UE coupled via a sidelinks) can only be assumed if the UEs are connected to the same base station. With respect to whether the base stations of the cellular network/operator have a common synchronization source (4), indication (4) signals to the UE which base stations can be used for synchronization in a shared carrier case. For example, the indication signals the UE regarding which base stations may be used to synchronize the sidelink transmissions in a shared sidelink carrier configuration (e.g., when a base station of the shared carrier cannot be receiver due to coverage limitation). If there is common synchronization, the UE may then be able to select another as base station's a synchronization source.

The information regarding whether the sidelink carrier is shared carrier or a dedicated carrier (e.g., 1 above) may be signaled by a network node, such as a base station, to the V2X UE, although this information may be provided to the UE in other ways (e.g., specified in a standard).

GNSS timing may be steered by an external, stable time reference such as UTC (although leap second handling may be different in different types of GNSS systems). In 4G/LTE, the sidelink transmissions may be synchronized to the GNSS timing. In 5G, the universally available time may be defined differently by, for example, specifying that transmissions are synchronized to UTC timing.

In some example embodiments, the base station, such as a gNB base station and/or the like, may indicate that it is synchronized to GNSS including UTC. If the V2X UE that receives and uses the timing from the base station is far away (with respect to distance from the base station), the propagation delay between the base station and the UE may cause the UE's timing to no longer be accurate. As the V2X UEs may be aware of their location and the location of the base station may be indicated to the UE, the UE may calculate the distance between the base station and the V2X UE to determine a propagation delay. For example, V2V messages may include position information, in which case the V2X UEs (e.g., UEs configured for V2X including V2V communications) may be aware of their location. Although the location of base station may not be known to a UE, the UE may be able to determine a base station's location by, for example, base station location information provided to the UE (which enables the UE to determine the propagation delay). The V2X UE may adjust, based on the determined propagation delay, for the propagation delays introduced by distance. The V2X UE may also determine a propagation delay between UEs and then compensate for the propagation delays introduced by distance between UEs (although this distance may be short and thus insubstantial/insignificant when compared to the larger distances and delays between the base station and UE).

Instead of indicating that a base station (e.g., gNB/eNB) is synchronized to GNSS and/or UTC, the base station may be aware of GNSS and UTC timing even when the base station is not synchronizing its transmissions to the GNSS and/or UTC. For example, the base station may be equipped with GNSS receiver circuitry, but instead of synchronizing the base station transmissions to GNSS, the base station may determine a timing difference between the base station's own transmissions and the GNSS timing. The base station may signal the timing difference to the UEs, so that the UEs may derive the GNSS timing based on the base station timing and the signaled offset. The base station may also provide to a UE specific timing offset signaling that enables a derivation of the GNSS and/or UTC timing from the base stations timing.

In some example embodiments, there may be a prioritized order for selecting synchronization sources in 5G's V2X sidelinks. The priority order may be specified in a standard, configured by the UE, configured (or signaled) by the network.

In some example embodiments, the priority order for use (or selection) of synchronization sources for dedicated SL carrier (or for other cases) is to select GNSS including UTC when available, which in the example of Table 1 has the highest priority. In accordance with for example Table 1, a UE may select a synchronization in priority order from 1 to 8. For example, a UE may select GNSS time (including UTC) from a satellite if available as a 1' priority, but if the UE cannot receive GNSS satellite information, the UE may then select as a timing or synchronization source a base station (e.g., gNB or eNB) that is synchronized to the GNSS/UTC as listed at 2 below. And, if 2 is not available to a UE, the UE may then select as a timing or synchronization source a base station having GNSS/UTC timing derived from an offset as listed at Table 1 at 3, and so forth.

TABLE 1

| | |
|---|---|
| 1 | GNSS |
| 2 | gNB/eNB synchronized to GNSS/UTC |
| 3 | gNB/eNB if GNSS/UTC timing can be derived based on offset signaling |
| 4 | UE synchronized to GNSS |
| 5 | UE synchronized to gNB/eNB that has UTC timing |
| 6 | Synchronized network (gNB/eNB not indicating GNSS/UTC as the sync source) |
| 7 | Unsynchronized network |
| 8 | UE that is independently generating sidelink synchronization signal (SS) |

In some example embodiments, the priority order of timing sources for shared carrier when network timing is preferred is in accordance with Table 2.

TABLE 2

| | |
|---|---|
| 1 | gNB operating in the carrier |
| 2 | gNB/eNB in a different carrier than the V2V sidelink carrier, where cellular network has synchronized transmissions in different carriers |
| 3 | UE synchronized to the cellular network |
| 4 | GNSS |
| 5 | Unsynchronized cellular network |
| 6 | UE that is independently generating sidelink SS |

Figure 2:
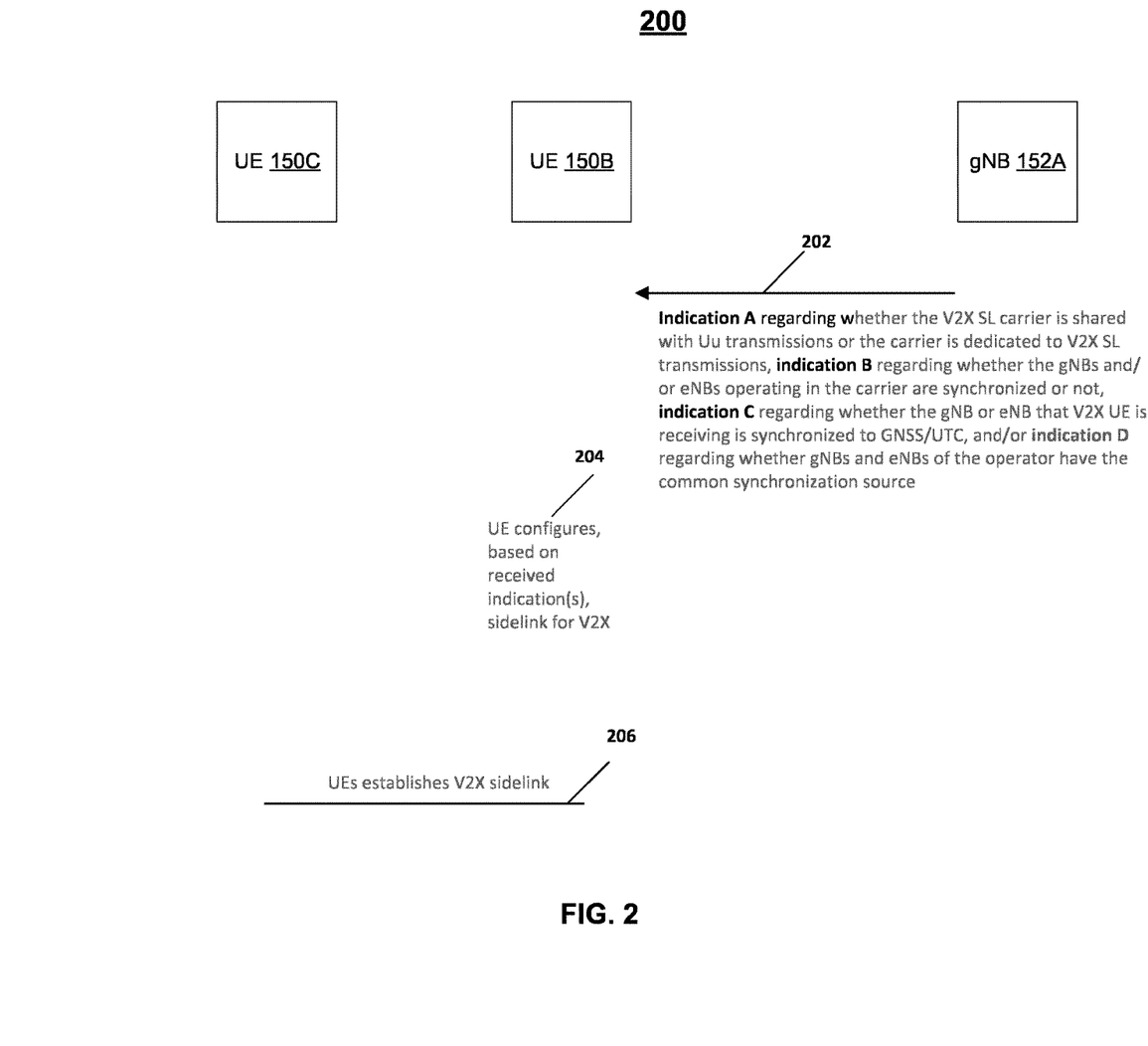
FIG. 2 depicts an example of a process for configuring V2X sidelinks, in accordance with some example embodiments.

FIG. 2 depicts an example of a process 200, in accordance with some example embodiments.

At 202, a base station, such as gNB base station 152A, may send to a first V2X UE 150B information, such as indications A, B, C, and/or D, in accordance with some example embodiments.

Indication A indicates whether the V2X sidelink carrier is shared with the uplink (e.g., Uu interface) transmissions or whether the carrier is dedicated to V2X sidelink transmissions. Indication B indicates whether the gNBs and/or eNBs operating in the carrier are synchronized or not. Indication C indicates whether the gNB or eNB (which is being received by the V2X UE) is synchronized to GNSS and/or UTC. And, indication D indicates whether the gNBs and eNBs of the cellular network have the common synchronization source.

For example, the information may include an indication A regarding whether the V2X sidelink carrier is shared with an uplink to a base station or whether the V2V sidelink transmissions, such as a device-to-device link(s) to other UEs or a broadcast to other UEs are implemented in a dedicated sidelink carrier. Regarding the indication B (whether one or more base stations operating in the carrier are synchronized), this may indicate to the UE that all the base stations in the carrier use the same synchronization source for example, in which case the synchronization signal received from a base station is suitable for sidelink transmission between UEs (even if the UE are connected to different base stations). Regarding indication C, it indicates to the UE whether the base station is synchronized to GNSS including UTC. Regarding indication D, it indicates to the UE whether the base stations and an operator's cellular network have a common synchronization source, so the UE can use timing from an LTE eNB or a 5G gNB as both share the common synchronization.

At 204, the V2X UE 150B configures, based at least in part on the received information at 202, a V2X sidelink to V2V UE 150A, in accordance with some example embodiments. For example, the V2X UE 150B may configure the sidelink in a shared or dedicated carrier based on the information received at 202. The UE 150B may also select the synchronization source to be used by the sidelink as well. The sidelink may, as noted, be a single device-to-device link directly between UEs or a broadcast to a plurality of UEs. At 206, V2X UE 150B establishes the configured sidelink to the V2X UE 150C, in accordance with some example embodiments.

Figure 3:
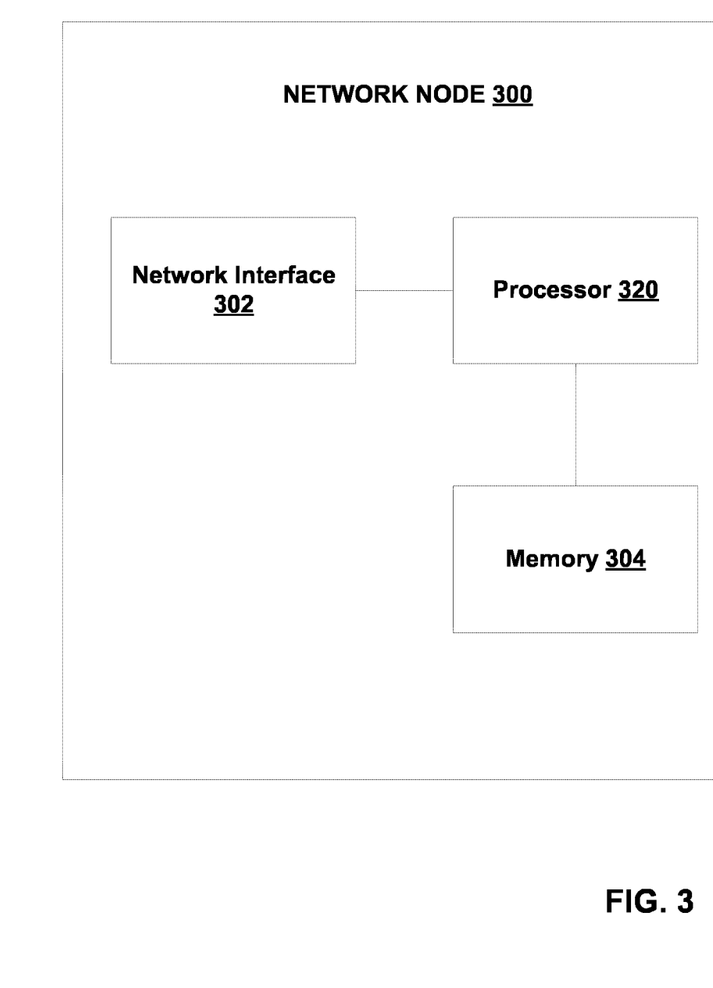
FIG. 3 depicts an example of a network node such as a base station, in accordance with some exemplary embodiments.

FIG. 3 depicts a block diagram of a network node 300, in accordance with some example embodiments. The network node 300 may be configured as a base station, such as base stations 152A-C. The network node 300 may include a network interface 302, a processor 320, and a memory 304, in accordance with some example embodiments. The network interface 302 may include wired and/or wireless transceivers to enable access other nodes including base stations and to provide a radio access network, such as a 4G, LTE, and/or 5G radio access network to UEs, such as UEs 150A-C. The memory 304 may comprise volatile and/or non-volatile memory including program code, which when executed by at least one processor 320 provides, among other things, the processes disclosed herein with respect to the base station.

In some example embodiments, the network node, such as gNB base station 152A may provide information, such as indications A, B, C, and/or D, in accordance with some example embodiments. For example, base station 152A may provide a radio access network to a user equipment configured to provide a vehicle-to-vehicle sidelink. The base station may send information to the user equipment, and this information may enable synchronized operation of the vehicle-to-vehicle sidelink between the user equipment and another user equipment. The information may be sent during connection set up or at other times as well. The base station may also allocate a carrier to be shared between the vehicle-to-vehicle sidelink and an uplink. As noted, the synchronization source for sidelink transmissions may be an LTE/4G eNB base station, although the 5G gNB base station may be used as a source as well. The base station, as noted, may send the base station's location to the user equipment to allow the user equipment to correct (e.g., compensate) for propagation delay induced errors in timing.

In some example embodiments, the network node may provide a base station, such as gNB 152A (or an eNB). The network node may provide a radio access network to a user equipment configured to provide a vehicle-to-vehicle sidelink. The network node may send information (e.g., indications disclosed herein) to the user equipment, the information enabling synchronized operation of the vehicle-to-vehicle sidelink between the user equipment and another user equipment. Moreover, the network node may allocate a carrier to be shared between the vehicle-to-vehicle sidelink and an uplink.

Figure 4:
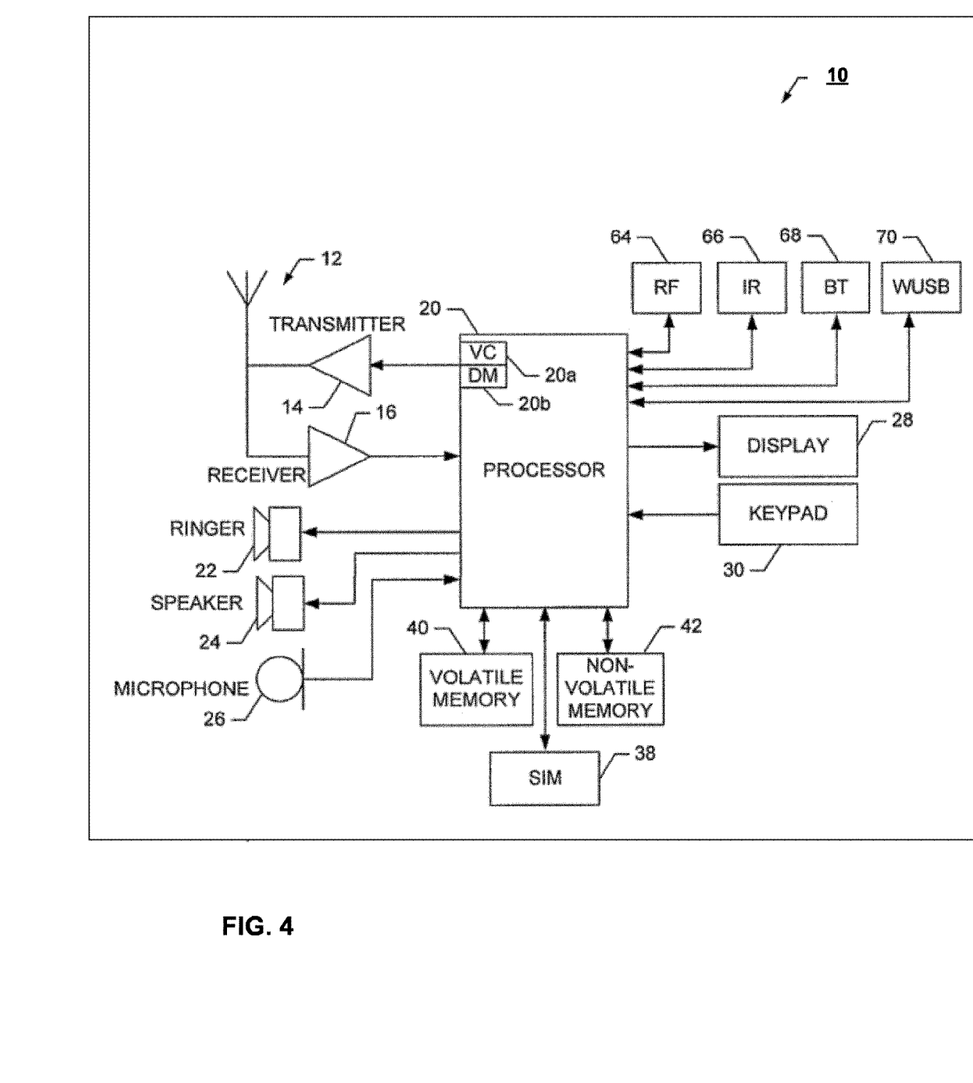
FIG. 4 depicts an example of an apparatus, in accordance with some exemplary embodiments.

FIG. 4 illustrates a block diagram of an apparatus 10, in accordance with some example embodiments. The apparatus 10 (or portions thereof) may be configured to provide user equipment, such as UEs configured to provide sidelinks, such as V2X sidelinks, V2V sidelinks, and/or the like. The user equipment may be implemented as any device including a wireless device, a smart phone, a cell phone, a machine type communication device, a V2X device, a V2P device, a V2N device, a wireless sensor or device at a vehicle, a network node, an IoT device, and/or any other processor-based device.

In some example embodiments, apparatus 10 may be configured to attach to a public land mobile network, receive local service information, request V2X service access, access a local V2X server, and/or perform other V2X operations.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth generation (5G), Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 112 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 112 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the user equipment. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment, such receive information to enable synchronized operation of a vehicle-to-vehicle sidelink with another user equipment, configure the vehicle-to-vehicle sidelink, and/or establish the sidelink.

Some of the embodiments disclosed herein may be implemented in software, hardware, application logic, or a combination of software, hardware, and application logic. The software, application logic, and/or hardware may reside on memory 40, the control apparatus 20, or electronic components, for example.

In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is improved V2X services.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, at a user equipment, information to enable synchronized operation of a vehicle-to-vehicle sidelink with another user equipment, wherein the information includes an indication regarding whether a plurality of the base stations including an evolved node B base station and a 5G node B base station have a common synchronization source; and
   configuring, by the user equipment, the vehicle-to-vehicle sidelink.

2. An apparatus comprising:
   at least one processor; and
   at least one memory including computer program code, the at least one memory and the computer program code configured to, with the at least one processor, cause the apparatus to at least:
   receive information to enable synchronized operation of a vehicle-to-vehicle sidelink with another user equipment, wherein the information includes an indication regarding whether a plurality of the base stations including an evolved node B base station and a 5G node B base station have a common synchronization source; and configure the vehicle-to-vehicle sidelink.

3. The apparatus of claim 2, wherein the vehicle-to-vehicle sidelink is on a dedicated carrier to at least the other user equipment.

4. The apparatus as in claim 2, wherein the vehicle-to-vehicle sidelink is on a shared carrier that is shared with at least a base station.

5. The apparatus as in claim 2, wherein the information includes an indication regarding whether the vehicle-to-vehicle sidelink is on a shared carrier with an uplink to a base station.

6. The apparatus as in claim 2, wherein the information includes an indication regarding whether a carrier is dedicated to the vehicle-to-vehicle sidelink.

7. The apparatus as in claim 2, wherein the information includes an indication regarding whether one or more base stations operating in the carrier are synchronized.

8. The apparatus as in claim 7, wherein the one or more base stations comprise all of the base stations operating in the carrier.

9. The apparatus as in claim 7, wherein the information includes an indication regarding whether the base station being received by the apparatus is synchronized to a global navigation system timing source, a coordinated universal time, and/or a global positioning system timing source.

10. The apparatus as in claim 9, wherein the apparatus is further caused to at least receive, from the base station, a location of the base station to enable the apparatus to compensate for timing error in network-based synchronization caused by propagation delay.

11. The apparatus as in claim 2, wherein the apparatus is further caused to at least establish the configured vehicle-to-vehicle sidelink.

12. A non-transitory computer-readable storage medium including program code which when executed by at least one processor causes an apparatus to perform at least the method of claim 1.

13. An apparatus comprising:
at least one processor; and
at least one memory including computer program code, the at least one memory and the computer program code configured to, with the at least one processor, cause the apparatus to at least:
provide a radio access network to a user equipment configured to provide a vehicle-to-vehicle sidelink; and
send information to the user equipment, the information enabling synchronized operation of the vehicle-to-vehicle sidelink between the user equipment and another user equipment, wherein the information includes an indication regarding whether a plurality of the base stations including an evolved node B base station and a 5G node B base station have a common synchronization source.

14. The apparatus of claim 13, wherein the apparatus is further caused to at least allocate a carrier to be shared between the vehicle-to-vehicle sidelink and an uplink.

15. The apparatus as in claim 13, wherein the information includes an indication regarding whether the vehicle-to-vehicle sidelink is on a shared carrier with an uplink to a base station.

16. The apparatus as in claim 13, wherein the information includes an indication regarding whether a carrier is dedicated to the vehicle-to-vehicle sidelink.

17. The apparatus as in claim 13, wherein the information includes an indication regarding whether one or more base stations operating in the carrier are synchronized.

18. The apparatus as in claim 13, wherein the information includes an indication regarding whether a base station being received by the user equipment is synchronized to a global navigation system timing source, a coordinated universal time, and/or a global positioning system timing source.

* * * * *